Figure 3:
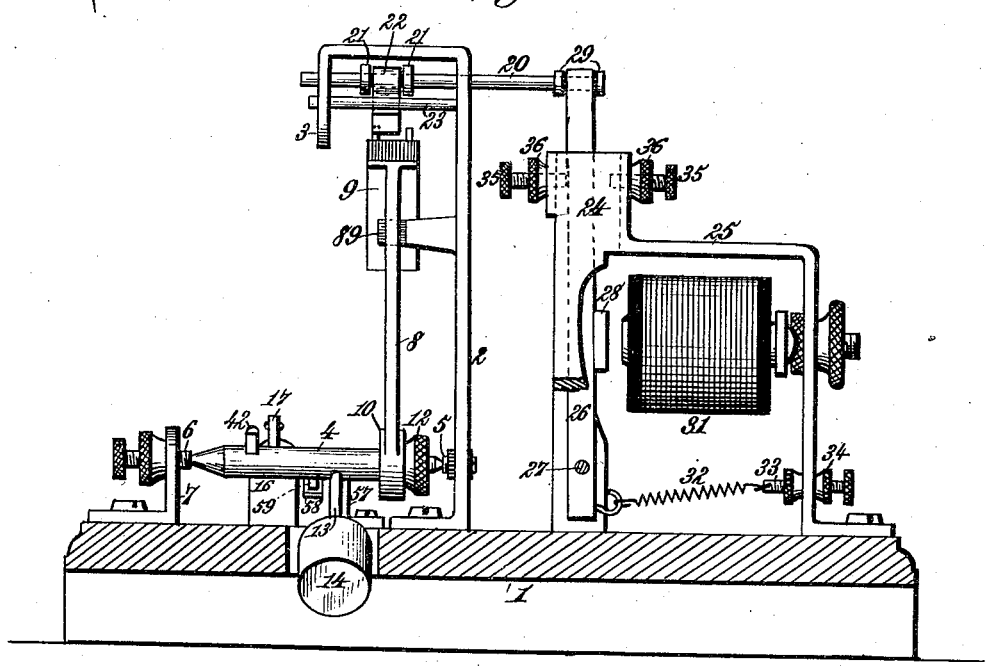

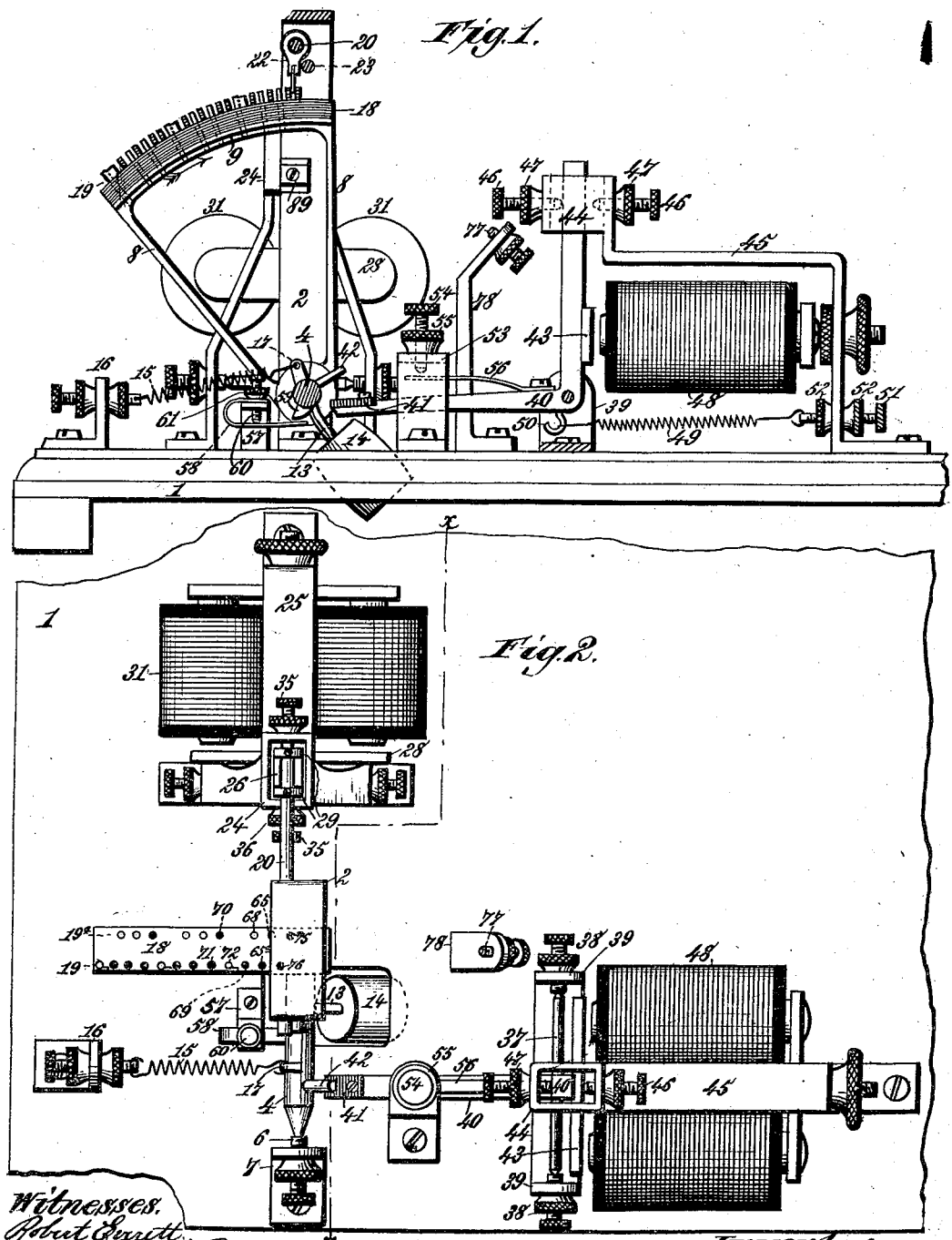

(No Model.) 3 Sheets—Sheet 2.
J. L. CUTLER.
APPARATUS FOR ELECTRICAL COMMUNICATION.

No. 426,989. Patented Apr. 29, 1890.

Witnesses: Inventor:
Robert Everett, James L. Cutler,
J. A. Rickford. By James L. Norris,
Atty.

(No Model.)  
3 Sheets—Sheet 3.
J. L. CUTLER.
APPARATUS FOR ELECTRICAL COMMUNICATION.
No. 426,989.  
Patented Apr. 29, 1890.
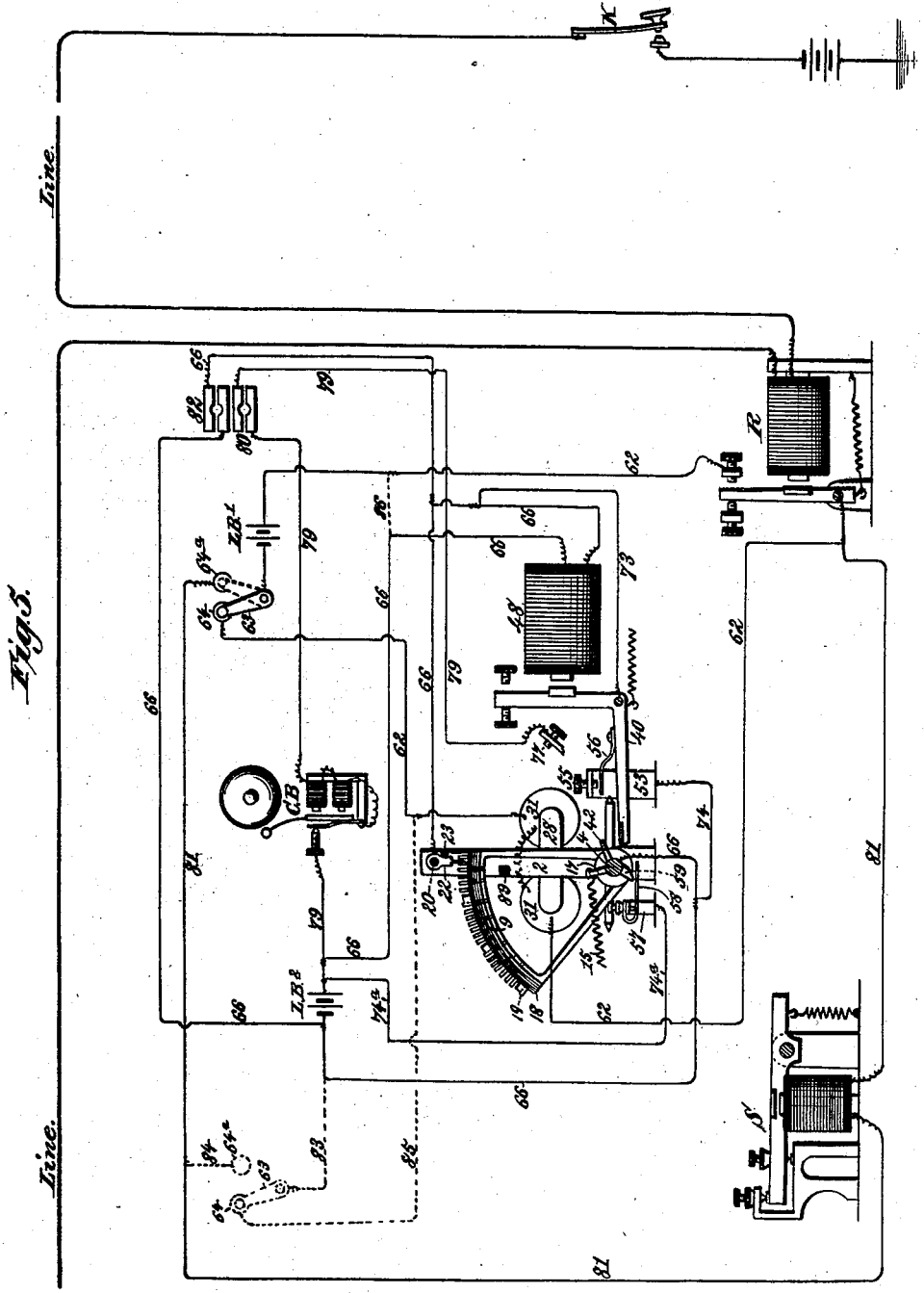
Witnesses.  
Inventor.  
James L. Cutler.  
By James L. Norris  
Atty.

UNITED STATES PATENT OFFICE.

JAMES L. CUTLER, OF PIKETON, OHIO.

APPARATUS FOR ELECTRICAL COMMUNICATION.

SPECIFICATION forming part of Letters Patent No. 426,989, dated April 29, 1890.

Application filed February 8, 1890. Serial No. 339,632. (No model.)

*To all whom it may concern:*

Be it known that I, JAMES L. CUTLER, a citizen of the United States, residing at Piketon, in the county of Pike and State of Ohio, have invented new and useful Improvements in Apparatus for Electrical Communication, of which the following is a specification.

My invention relates to systems of electrical communication adapted to telegraph, telephone, signaling, and other electrical circuits.

It is the purpose of my invention to provide an apparatus which may be included in a local or relay circuit at any station upon a main line, and in which I provide an instrumentality having a definite and variable representation of a predetermined succession of electrical impulses, which are repeated, with the proper differentiation, throughout the other individual members of the series of instruments in the circuit, whereby, any one of a predetermined series of impulses being sent over the main line, an operative action of one of the instrumentalities on the line will be produced, thereby controlling a local circuit or circuits and operating a local signal, either audible, visual, or of other character.

To state the purpose of the invention more specifically, it is my object to provide an apparatus comprising a simple arrangement of local circuits which may be operated by either one or more local batteries, whereby the transmission over the main line of a predetermined succession of electrical impulses of varying length or representing any one or more than one of the known electrical symbols or intelligible characters, or any arbitrary arrangement of such impulses, addressed to some one of the individual mechanical members of the series of instruments, shall operatively affect the same and cause a sufficient progressive movement or action therein to close a local signaling or other circuit, by which an audible, visible, or other signal shall be operated or other mechanical or electrical result be produced at the station to which the said series of impulses is addressed.

It is a further purpose of my invention, however, to so organize the apparatus embodying my invention that by an infinite variation of arrangement of insulated and electrically-connected projections, lugs, or detents, both arranged upon a movable part of the apparatus, a given or selected succession of electrical impulses sent over a main electrical circuit and through a series of local stations upon said circuit shall produce a definite and exact result in or upon one individual arrangement of such details and contacts, whereby a definite and predetermined result shall be produced at the station with which such a combination of impulses is identified, to the exclusion of all other points upon the same main line.

In other words, it is my purpose to provide means whereby an individual call may be sent over a main line of any length, and addressed to any of the established points or stations on said line, to operate a local circuit controlling a visible or audible signal—such as a bell, a light, or a semaphore—and to effect such result with certainty and without response by the other similar signals on the same circuit.

It is my purpose, in short, to provide a simple and comparatively inexpensive arrangement and organization of parts whereby patrol-lines, signal-circuits, telegraphic, telephone, and other circuits, as well as other systems of electrical communication, may be absolutely controlled from any single point in any given circuit and in any required manner for the production of any desired result, either mechanical or electrical; and the special object of my invention is to render this control of the entire series of local circuits as absolutely accurate as possible and to eliminate from the operation all possible uncertainties or errors.

To these ends my invention consists in the several novel features of construction and new combinations of parts hereinafter fully set forth, and then definitely pointed out in the claims following this specification.

To enable others skilled in the art to practice my said invention, I will describe the same in detail, reference being had to the accompanying drawings, in which—

Figure 4:
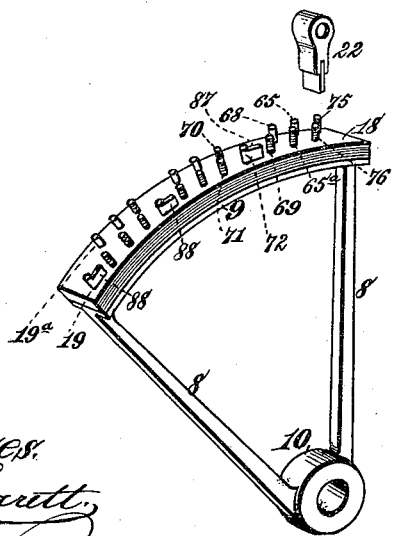

Figure 1 is a side elevation of an apparatus embodying my invention. Fig. 2 is a plan view of the same. Fig. 3 is a transvertical section upon the line *x x*, Fig. 2. Fig. 4 is a detail perspective showing the segmental carriage with stop-pins and the contact-pawl engaging said pins, the latter being removed from its shaft. Fig. 5 is a diagram showing the several circuits.

In the said drawings I have shown the parts composing the apparatus as mounted and arranged upon a base-plate 1, which may be of wood or other suitable material. Mounted upon this foundation is a vertical bracket 2, provided at its upper end with a horizontal portion which supports a short drop-arm 3.

The numeral 4 denotes a rock-shaft having conical journals which are supported one in a recessed insulating-seat 5, mounted in the vertical bracket 2, and the other in a threaded adjustable bearing 6, tapped through an angular bracket 7, mounted on the base-plate 1 at a suitable distance from the bracket 2. Rising from this rock-shaft is a carriage consisting of two diverging arms 8, which are united at their upper extremities by a curved plate 9, which is bent into the arc of the circle of which the arms 8 are the radii.

To render the carriage adjustable upon its axis, I provide it, preferably, with a hub 10, which slips upon a diminished end of the rock-shaft 4 and is held against a shoulder thereon by a thumb-nut 12, turned upon the threaded journal of the shaft. Upon the shaft is mounted an arm 13, carrying a weight 14, which may, for convenience, lie in an opening in the base-plate 1, the arrangement being such that the weight will normally tend to throw the carriage in the direction shown by the arrow in Fig. 1. A spring of light tension, adjustably connected at one end to a bracket 16 on the base-plate and at the other end to a short arm 17 on the shaft, partly counteracts the action of the weight. This spring is of very light tension, and its function is more particularly to counterbalance the segmental carriage, which passes its central point of equilibrium above the shaft before the weight 14 reaches its corresponding point below said shaft and thus exerts a constantly-increasing rotative force, the resistance of the spring increasing with the same in order that the restoration of the carriage to its normal position may not require the exertion of an excessive force.

Mounted upon the curved plate 9, forming part of the segmental carriage, is an insulating-shoe 18, formed of rubber or other suitable material and coextensive with the plate on which it is mounted. In this shoe are set two parallel series of pins 19 and 19ª, each series being composed in part of any suitable material—such as, for example, brass—and buried in the shoe far enough to give firm support thereto, but having no contact with the curved plate 9 of the carriage. The other pins in each series are formed either of platinum and placed in electrical contact with the curved plate 9, which is, like the arms 8, of diamagnetic material—such as brass—or they may be constructed of brass and provided with platinum contacts, electrical communication being in all cases insured between these members of both series and the curved and radial arms of the carriage. Those pins, stops, or projections which are insulated from the carriage proper may of course be constructed from any material preferred, and may even constitute portions of the insulating-shoe 18, being substantially nothing more than teeth, lugs, or stops of suitable length. The variable arrangement of the two parallel series of pins or stops and contacts arranged upon and projecting from this insulating-shoe will be specifically explained hereinafter in its proper place.

Arranged above the carriage and having support in the vertical bracket 2 and in the drop-arm 3 is a horizontal shaft, rod, or bar 20, extending some distance beyond the bracket 2 and adapted to have free longitudinal movement in its bearings in the bracket 2 and drop-arm 3. Upon this shaft, immediately over the insulating-shoe 18 and confined between two collars 21, is mounted a contact-pawl 22, having a free swinging movement on said shaft 20 between the collars 21. Inasmuch as said shaft is arranged transversely to the insulating-shoe 18 and in substantial parallelism with the rock-shaft 4, the contact-pawl 22 will swing in the same vertical plane in which the segmental carriage vibrates. In order that said contact-pawl may constitute a stop which shall arrest the carriage in moving in the direction indicated by the arrow in Fig. 1, a rigid bar 23 is mounted on the vertical bracket 2 and drop-arm 3, said bar lying immediately behind the pawl, as best shown in Fig. 1, and limiting its movement in one direction. This contact-pawl is of such length that when hanging vertically its point engages the stop-pins or electrically-connected pins mounted upon the carriage, arresting the movement of said carriage in the direction of the arrow in Fig. 1, but swinging and freely permitting its movement in the opposite direction. It must be understood, of course, in this description that the rock-shaft 4 is insulated from the post or bracket 2, and that the arrangement and construction of the contact-pawl are such that it shall normally have engagement with the series of projections and contact-pins 19, but may, by the longitudinal movement of the shaft, be thrown across the insulating-shoe and engaged with the other and parallel series of projections and contacts 19ª. The pawl is maintained in the position shown in Fig. 3, in which it engages the series 19, first mentioned, and is shifted to engage the parallel series 19ª by the means about to be described.

Beneath the projecting end of the shaft 20 is arranged a bracket-frame, consisting, ordinarily, of an open frame 24, rising from the base-plate and having an extension 25. Within the open frame 24 is pivoted an armatured lever 26, having its pivotal point 27 below the armature 28, and its vibrating end hooked or sleeved upon the end of the shaft 20 between collars 29.

Mounted adjustably upon the vertical portion of the extension-frame 25 is an electro-magnet 31, having its cores so arranged that when energized said magnet will attract the armature 28 and throw the lever 26 toward said magnet and away from the vertical bracket 2, thereby drawing the shaft 20 in the same direction and releasing the contact-pawl 22 from the series 19 and throwing it into engagement with the series 19$^a$. It will be seen that in passing from the one series to the other the carriage is for an instant released and will move under the impulse of the weight 14 in the direction of the arrow in Fig. 1, whereby the pawl will enter between two of the projections or pins in the series 19$^a$ diagonally opposite its point of engagement with series 19, thus permitting the carriage to move a single step. Inasmuch as the projections and pins in the one series alternate with those of the others, this movement will be substantially equal to one-half the interval between two adjacent pins or projections. A spring 32, connected to the lever 26 below its pivot and attached at its other end to the extension-frame 25, throws the armature off the core of the magnet, when the latter is cut out of circuit and restores the pawl to its engagement with the series 19. The tension of the spring 32 may be varied by attaching the end to a threaded bar 33, which is passed through an aperture in the vertical member of the extension 25, thumb-nuts 34 being turned upon said bar on each side of the frame 25. The throw or vibration of the armature-lever 26 is adjusted in either direction by stops 35, which may be set to any delicate adjustment, being tapped through the walls of the bracket-frame 24 and provided with jam-nuts 36.

Upon the base-plate 1, at some distance from but parallel with the rock-shaft 4 of the carriage, is a rock-shaft 37, having conical journals seating in adjustable bearings 38, the latter being supported in brackets or lugs 39. Upon this rock-shaft 37 is mounted an elbow or bell-crank lever 40, the horizontal arm thereof being provided with a rubber or other insulating cushion 41, which lies near the rock-shaft 4 and immediately beneath an arm or lug 42, projecting radially from said shaft. The vertical arm of the lever 40 is provided with an armature 43, and its end extending above said armature passes through a box or open frame 44, supported by an angular bracket-frame 45, said box or open frame being of such dimensions as to permit the vibration of the lever, its movements being limited in both directions by stop-pins 46, tapped through opposite sides of the box and provided with jam-nuts 47. The armature 43 is attracted by an electro-magnet 48, mounted on the angular bracket 45, and is thrown off the cores of said magnet by a spring 49, connected at one end of an eye 50 below the rock-shaft 37 and at the other end to a threaded rod 51, passed through the bracket 45 and having jam-nuts 52 turned thereon on both sides of the bracket.

Midway or thereabout of the horizontal arm of the bell-crank lever is arranged a Z-shaped bracket 53, mounted on the base-plate and having its upper horizontal arm or member overhanging the horizontal arm of the bell-crank lever. Through this upper member of the bracket 53 is tapped a set-screw 54, locked by a jam-nut 55, which is provided with a platinum point, which makes contact electrically, when the horizontal arm of the bell-crank lever 40 rises, with a spring 56, mounted on said arm.

Upon the other side of the rock-shaft 4 is arranged a Z-bracket 57, upon which is mounted a spring 58, which is bent around to pass beneath the supporting end of the bracket, its free and elastic extremity lying beneath the shaft 4. Upon this shaft is formed or mounted a lug or arm 59, which is normally out of contact with the spring, but which makes a momentary contact therewith as the rock-shaft 4 rotates upon the restoration of the carriage to the position shown in Fig. 1. This contact is caused, as will be explained more fully hereinafter, by reason of the fact that as the carriage is thrown in the direction contrary to that indicated by the arrow in Fig. 1 its momentum causes it to pass somewhat beyond its normal point of rest, thereby causing the lug 59 to impinge upon the spring 58; but this contact is immediately broken by the slight retrograde vibration of the carriage as it assumes its proper position with the contact-pawl 22 lying against the first stop lug or projection in the series 19. The spring 58 is fastened upon the bracket 57 by means of a set-screw 60, tapped through the horizontal arm of the bracket and passing through the end of the spring, a jam-nut 61 being turned upon the set-screw and lying against the end of the spring. The end of the set-screw impinges upon the spring below the supporting-arm of the bracket and enables the operator to adjust the position of the free end of said spring to give exactly the required contact between said spring and the lug, arm, or projection 59 on the rock-shaft.

I will now proceed to describe the several circuits, as shown in the diagram of circuits in Fig. 5. At each local station upon the line are arranged in any suitable manner the office-relay R and the sounder or register S, the line-wire being connected with the terminals of the relay-magnet in the usual manner. From the back-stop of the relay a wire 62 is run to one pole of a local battery L B', and from the other pole of said battery a continuation of the same wire runs to a switch 63. From one of the switch-contacts 64 a further continuation of the same wire is run to one of the terminals of the electro-magnet 31, and from the other terminal a still further continuation of said wire is carried to the armatured lever of the relay R, thus making a complete circuit from the local battery L B' whenever the main line is closed, which may be by means of a key K at any distant station. The establishment of this local circuit energizes the electro-magnet 31, attracts the armature of the lever 26, and produces a longitudinal movement of the shaft or bar 20, thereby withdrawing the contact-pawl 22 from the series 19 of the stops on the shoe 18 of the carriage and carrying said pawl transversely across the said shoe and engaging its point with the series 19ª. If the circuit controlled by the key K is closed momentarily, or, in other words, if the electrical impulse transmitted over the main line and over the circuit described is of the length of the "dot" of the Morse alphabet, then the lever 26 will vibrate toward the electro-magnet 31 and will instantly be thrown back to its normal position, thereby missing contact with the pin or stop 65, which stands second in the series 19ª, but resuming its normal position by reason of the pull of the spring 49, which throws it in front of the second pin 65ª in the series 19, the carriage having moved under the impulse of the weight 14 through a space equal to the interval between the first and second engagements of the contact-pawl. This stop 65, being insulated from all electrical contact by being buried in or forming part of the shoe 18, it will arrest the movement of the carriage and hold it in its advanced position until a further impulse is sent over the line and through the same circuit already described.

From the post or vertical bracket 2, in which the shaft or bar 20 has support and with which it is in electrical contact, a second circuit is run, consisting of a wire 66, which runs by a branch to the one terminal of the restoring-magnet 48, thence from the other terminal to the positive pole of a second local battery L B², and thence from the negative pole of said battery to the carriage or the shaft upon which it is mounted. Let it now be supposed that the second electrical impulse transmitted over the line is a dash. In this case the magnet 31 will draw and hold the lever 26 for a sufficient period of time to enable the carriage to travel far enough under the impulse of the weight 14 to bring the third pin 68 in the series 19ª against the contact-pawl 22, thus closing the circuit over wire 66, energizing the restoring-magnet 48, actuating the bell-crank lever 40, raising its horizontal arm, and drawing the insulating-cushion 41 on said arm against the arm or lug 42 on the rock-shaft 4, thereby rotating the latter and returning the carriage to its original and normal position. On the other hand, and under the arrangement of insulated stops and conducting-pins shown in the drawings, if the second electrical impulse be a dot of the Morse alphabet the contact-pawl 22 will pass in front of the electrically-connected pin 68, but, escaping contact therewith, will return to series 19 and rest in front of the insulated stop or projection 69 in the latter series, thus permitting the carriage to make a further advance or second step. If, now, a third impulse is sent over the line-wire and if this impulse be a dash of the Morse system, the armatured lever 26 will be thrown and will carry the contact-pawl 22 off the insulated point or projection 69 in the series 19, and the lever will be held long enough, without regard to the length of the impulse, provided it be more than a dot or instantaneous closure, to permit the carriage to travel far to bring the fourth insulated point or projection 70 in the series 19ª against the contact-pawl 22. It will be seen that under the arrangement of the insulated points and electrically-connected pins on the carriage the third impulse sent over the line must be a dash, in order to bring the contact-pawl against the insulated point 70 on the shoe. The release of the lever 26 by the termination of the third impulse returns the contact-pawl back to its normal position in engagement with series 19 and brings the fifth projection or point 71 in said series against the contact-pawl, thus arresting the carriage after a further advance. Should the third electrical impulse be a dot, however, the pawl will return to the electrically-connected pin 72 in the series 19, and the restoring-magnet 48 will be at once switched into circuit, bringing the carriage back instantly to its normal position. In like manner the remaining electrical impulses are transmitted, their length being made to correspond with the relative position of the contact-pins and insulated projections in the two series 19 and 19ª, and with relation also to the position of the electrical contacts in both series. In the apparatus shown I have arranged the two series to operate upon a threefold repetition of the Morse characters representing the letter "U"—that is to say, two dots followed by a dash, the three characters being thrice repeated. I may, and preferably do, use four letters upon each carriage, and these letters may all be different from each other, or partly so, the character and sequence of the impulses required to advance the carriage by a series of intermittent steps being indicated, as already stated, by the relative arrangement of points and pins in the two parallel series.

It will be seen that in the event of a wrong arrangement of the electrical impulses or mistake in the length or character of an individual impulse the circuit of the magnet 48, which I have termed the "restoring-magnet," will be instantly established through one of the contact-pins on the carriage, the contact-pawl, and the wire 66. As the carriage begins its retrograde movement, electrical contact between the pawl 22 and the pin through which the circuit is established will be immediately broken before the carriage has accomplished more than a mere initial movement toward restoration to normal position. In order to maintain the circuit of the restoring-magnet, therefore, I provide the subsidiary or auxiliary circuit, as follows: As the armatured lever 40 is attracted and as its horizontal arm rises, the spring 56 makes contact with the point of the set-screw 54, tapped through the bracket 53, the spring being of such light tension as to permit the lever to move without obstruction until arrested by its back-stop. To the bell-crank lever is attached a wire 73, which is connected by the wire 66 to one terminal of the restoring-magnet. From this point the circuit is by way of the wire 66 from the other terminal of said magnet to the positive pole of the battery L B², and thence from the negative pole by wire 66 to a branch wire 74, which is electrically connected to the bracket or post 53, thus completing the circuit. Upon the restoration of the carriage to normal position it is essential to break this circuit in order to release the carriage, and for this purpose I provide a short circuit, as follows: From the negative pole of the battery L B², supporting the circuit of the restoring-magnet, the wire 66 is connected directly to the axle of the carriage or rock-shaft 4, and from the post or bracket 57 a wire 74ª is carried to the other pole of the battery. As the carriage is returned to normal position by the maintenance of the circuit of the restoring-magnet, it passes slightly beyond the point at which it ultimately rests, and thereby brings the lug or arm 59 on the rock-shaft 4 into contact with the spring 58, thereby establishing the circuit and short-circuiting the restoring-magnet. If the main line is still closed, the contact-pawl will drop in front of the initial point or projection 75 in series 19ª, and upon opening the circuit on the line said pawl will instantly pass over and engage the initial point or projection 76 in series 19. The alternating arrangement of these parts or projections allows the carriage a slight movement, which is sufficient to raise the lug 59 off the spring 58 and break the short circuit. When the carriage has progressed to its full limit of movement, it abuts upon an adjustable contact 77, which is mounted upon a post 78 at a suitable point. From this contact a wire 79 is run to one member of a make-and-break 80, which may be of any preferred construction, that shown in the drawings being composed of two brass plates separated from contact and having a seat for a plug, by which electrical communication is established and by the removal of which it is broken. From the other member of this make-and-break a continuation of the wire 79 connects with the magnet of the call-bell C B or other signal, and from the make-and-break on this bell a further continuation of said wire is carried to the positive pole of the battery L B². From the other pole the circuit is completed by way of wire 66 to the rock-shaft 4, and the bell, if an audible signal is used, rings continuously until the local operator, whose attention is attracted thereby, removes the plug from the make-and-break 80, thereby breaking the circuit of the call-bell or other signal. At the same time he throws the switch 63 over upon the contact 64ª, thereby bringing the sounder into circuit through the wire 62 from the back-stop of the relay R through the battery L B', thence by way of a wire 81 to one terminal of the magnet of the sounder, and from the other terminal of said magnet by a continuation of the same wire 81 back to the armature of the relay. Thus the main line is now open through the battery L B' and sounder S, the controlling-instrument being cut out. At the same time the operator, after removing the plug from the make-and-break 80, places it in a similar make-and-break 82, which forms part of the circuit from the post or bracket 21 by way of wire 66 to one member of said make-and-break, thence from the other member of said make-and-break by way of the wire 66 to one pole of the battery L B², from the other pole of said battery by way of the same wire 66 to one terminal of the restoring-magnet, and thence by way of the same wire to the other member of the make-and-break. This instantly restores the carriage to place and short-circuits the restoring-magnet in the manner already described.

It will readily be seen that by the arrangement of circuits described a series of instruments—such as telegraphic sounders, telephones, or audible or visible signals—arranged in any number and at different and distinct points upon a single circuit, may be individually called or operated without disturbing or, at least, without operatively actuating any of the other individual members of the series. For example, if each of the carriages in the several instruments throughout the series is equipped with a distinct combination of insulating points, or projections and electrically-connected pins arranged in accord with Morse signals for one, two, or more different letters, or, as may easily be done, arranged without regard to the Morse alphabet, the variation of what may be termed the "individual call" on each carriage may be made almost infinite. Moreover, the interposition of conducting-pins at certain points in the series will effectually prevent the use of false or mistaken combination of electrical impulses should the same be addressed to any one of said instruments. Thus an operator at any terminal or line station may call up any other station upon the line by simply transmitting over the line the arrangement of electrical impulses identified with such local station. These impulses are transmitted, of course, over the entire line, and every instrument on the line will respond thereto in part; but, inasmuch as there is but one out of the entire series which is organized in perfect harmony with the particular combination of electrical impulses transmitted there will be but one instrument in which the carriage will advance far enough to establish a circuit through the contact 77, thereby closing the bell-circuit. In every other instrument on the line an initial or partial response, more or less complete, will be made; but, by reason of the fact that the individual combination of impulses is not in harmony with the arrangement of insulating-points and electrically-connected pins on the carriages of such instruments, they will all cut their restoring-magnets into circuit and replace the carriage to normal position before any contact is established between said carriage and the point 77. Thus, while there may be a partial or incomplete movement of all the carriages upon the line, no operative or complete action will take place save only in the one instrument to which the individual combination is addressed.

It will readily be seen that I may operate the instrument by a single local battery in place of two such batteries, and I have indicated one arrangement of circuits in the diagram Fig. 5 for this purpose—for example, by removing the switch 63 to the position shown in dotted lines to the left of the local battery L B² and connecting the switch-arm by a wire 83 (shown in dotted lines) to the wire 66 from the negative pole of said battery, which one of the contacts is connected by a wire 84 to the wire 81 and the other contact by a wire 85 to the wire 62. This enables me to dispense with the battery L B' and. with a part of wire 62, a cross-connection 86 being made therefrom to the wire 66, as shown in dotted lines. The course of the circuits is so plainly shown under this modified arrangement as to require no explanation.

Inasmuch as one of the most essential requisites of a mechanism of this type is accuracy, and in view of the fact that when the pins, points, or detents are arranged upon the carriage in accordance with any predetermined succession of electrical impulses some slight change in the order of succession might by chance work the carriage forward to the point where it will close the bell-circuit or operate such other signal as may be substituted therefor, I have provided certain safeguards to avoid the possibility of such result, as follows: It will be seen that at those points where a dash or long impulse is indicated—as, for example, between the pins 68 and 70 on the carriage in Fig. 2—it is barely possible that two dots or short impulses might so vibrate the contact-pawl that it would pass between the insulated point or detent 69 in series 19 and the electrically-connected pin 72 in the same series, these two short impulses being in this case the equivalent of the long single impulse. While it is exceedingly improbable that this will occur, still, in order to effectually guard against such possibility, I interpose in the space between said pin 72 and the detent 69 a platinum or other electrical contact 87, electrically connected to or forming part of the pin 72, which will engage the contact-pawl should it be thrown by a short impulse into engagement with or between the said pins in series 19 and at once close the circuit of the restoring-magnet 48. A similar contact 88 may also be placed in series 19 opposite each of the spaces in series 19ª, which represents a long impulse or dash. A stop 89 is placed upon the post or bracket 2 to arrest the vibration of the carriage after it has passed far enough under the impulse of the restoring-magnet to close the short circuit for said magnet.

It will be seen that this invention is eminently adapted not only to the operation of a system or series of signals, either visible, audible, or otherwise, but may also be employed as an individual call upon telephone or telegraph circuits. When used upon telephone-lines, it will take the place of the magneto-bell usually connected with each telephone, and by the use of said invention it will readily be understood that there will be no disturbance on the line of any signal other than the one to which the call is addressed. In railway-telegraph service also, as well as on lines where there are a number of small stations where the operator is compelled by the variety of his duties to be absent from the instrument a portion of the time, the invention will be found of value, as it provides infallible means for calling attention to the fact that communication with such office is desired, and this result is effected without disturbing the instruments at the other stations upon the same circuit. So, also, in the case of patrol-lines, an exceedingly convenient and effective method is provided for establishing communication with any point upon such a line.

It should be noted, as I have already indicated, that I do not limit my invention to any specific construction of parts or to any particular means for releasing and actuating the carriage or support upon which I arrange the double series of insulated and electrically-connected detents, since I may use a simple bar or plate having rectilinear or other movement provided either by electrical or mechanical means. In many other respects, also, the arrangements of parts and the type of construction shown may be considerably modified without departing from my invention.

I will also direct attention to the fact that the restoring-magnet should be of considerably less resistance than the magnet 31, while the short circuit for the restoring-magnet should be of least resistance of all. The reasons for this are so apparent, especially when the instrument is operated by a single local battery, that no detailed explanation is required to a person skilled in the art.

The apparatus described in this application I have termed a "telechone" or "telekone," from the Greek words Τηλε and Εχω, meaning to conduct, order, or manage from a distance, for the reason that it is so organized that it provides a complete control over certain local circuits, which control is exercised from afar or from any distance covered by an electrical circuit.

In the series of instruments described, arranged upon a single line or circuit, each having identification with a separate succession of electrical impulses, it will readily appear to those familiar with the art that in the transmission over the main line of any given series or succession of such impulses it may happen that the initial impulse will find one or more of the said instruments either partially operated or, perhaps, so far advanced that a single action will operate the local signaling-circuit. In order to render the action of the entire series absolutely accurate, it is necessary that every instrument shall be set in such position that each one shall respond to the initial impulse sent over the line and shall make such response from its normal position of rest, to which it is returned by the action of the restoring-magnet. In order, therefore, to reset every instrument in circuit to this position prior to the transmission of any given succession of impulses intended to affect any single member of the series of instruments, a resetting succession of impulses is employed as follows: If the arrangement of insulated and conducting detents or projections upon one or more of the carriages commences with the momentary impulse, commonly known as the "dot" of the Morse alphabet, then the apparatus will be infallibly reset or returned to normal position by transmitting a series of prolonged impulses or dashes, one more in number than the greatest number of such impulses appearing in any one of the single sequences of impulses represented by the arrangement of detents upon the carriage of such instrument. In the same manner any instrument beginning upon the dash or prolonged impulse may be reset by the transmission of a series of momentary impulses or dots exceeding in number the greatest number of such dots represented upon or identified with any single sequence of impulses upon which any instrument in the circuit is wholly or partly operated.

I prefer to organize the permutation of impulses upon which the several instruments in a single circuit are rendered operative upon an arrangement beginning with one or more of the momentary impulses or dots mentioned; but this is by no means indispensable, and is no more than a matter of convenience in order that one and the same resetting combination shall apply to every apparatus upon the line.

What I claim is—

1. In an electrical apparatus for controlling one or more local circuits, the combination, with a main line, of a mechanically-advanced and an electrically-released carriage or support having a double series of conducting and non-conducting pins, points, or projections arranged in accordance with a predetermined series of intelligible signals, a contact-pawl adapted to vibrate from one series to the other and free to swing in a direction opposite to the normal movement of the carriage, a circuit normally connected with the line and controlling the vibrations of said pawl, and a restoring-circuit operated by a local battery which is switched in by the engagement of the contact-pawl with one of the conducting-pins on the carriage, substantially as described.

2. In an electrical apparatus for controlling one or more local circuits, the combination, with a main line, of a carriage or support having normally a progressive movement and provided with a double series of conducting and non-conducting pins, points, or projections arranged in accordance with a predetermined series of intelligible signals, means for advancing said carriage or support, a contact-pawl adapted to vibrate from one series of said pins, points, or projections to the other and free to swing in a direction opposite to the normal movement of the carriage, a circuit normally forming part of the main line and controlling the vibrations of said pawl, and a restoring-circuit operated by a local battery which is switched in by the engagement of said contact-pawl with any one of the electrically-conducting pins, points, or projections, substantially as described.

3. In an apparatus for controlling one or more electrical circuits, the combination, with a main line, of a carriage or support having normally a progressive movement and provided with a double series of alternating pins, points, or projections, part of which are insulated, the two series being arranged in accordance with a predetermined succession of electrical impulses, a contact-pawl adapted to vibrate from one series to the other and free to swing in a direction opposite to the normal movement of the carriage or support, a circuit controlling the vibrations of the contact-pawl by the impulses sent over the main line, a restoring-magnet, and a circuit for said magnet formed in part of the contact-pawl and one of the pins, points, or projections in electrical communication with the carriage or support, substantially as described.

4. In an electrical apparatus for controlling one or more local circuits, the combination, with a main line, of a local relay, a carriage or support having normally a progressive movement and provided with a double series of alternating pins, points, or projections arranged in accord with a predetermined series of electrical impulses, a local circuit for the magnet vibrating the pawl operated by the relay, and a separate local circuit restoring the carriage to normal position and established through the contact-pawl and one of the electrically-connected pins in either series, substantially as described.

5. In an apparatus for controlling one or more local circuits, the combination, with a carriage or support having normally a progressive movement and provided with a double alternating series of pins, points, or projections, part of which are included in one of said local circuits, of means for advancing said carriage, a circuit vibrating the contact-pawl and operated by a local relay, a restoring-circuit established through the contact-pawl and one of the pins, points, or projections having electrical connection with the carriage or support, and a local signaling-circuit closed by said carriage upon reaching its limit of normal movement, substantially as described.

6. In an apparatus for controlling one or more electrical circuits, the combination, with a carriage or support having progressive movement, of means for electrically releasing said carriage, a contact-pawl vibrating from one to the other of the two, alternating series of pins, points, or projections mounted on said carriage, certain members of each series being in electrical connection with said carriage, a local relay forming part of the releasing-circuit, a restoring-circuit established by the engagement of any one of the electrically-connected pins or projections on the carriage with the contact-pawl, a signaling-circuit closed by the carriage upon reaching its normal limit of movement, and a short circuit for the restoring-magnet, substantially as described.

7. In an apparatus for controlling one or more local circuits upon a main line, the combination, with a local relay, of a contact-pawl carried by a longitudinally-vibrating support and energized by the impulses sent over the line through the relay, a carriage having progressive movement and provided with a double series of pins, points, or projections, part of which are insulated from the carriage and with which the contact-pawl has alternate engagement as the carriage advances, a restoring-magnet energized by the engagement of said contact-pawl with one of the electrically-connected pins or projections, a maintaining-circuit for the restoring-magnet, and a short circuit therefor, closed by the return or restoration of the carriage, substantially as described.

8. In an apparatus for controlling one or more local electrical circuits, the combination, with a carriage or support having normally a progressive movement and provided with a double series of alternating pins, points, or projections, part of which are in electrical contact with the carriage, of a magnet normally in circuit with the local relay for vibrating said contact-pawl in accordance with the impulses transmitted over the main line, a restoring-magnet lying in a local circuit which is closed through the contact-pawl and one of the electrically-connected pins or projections on the carriage or support, a signaling-circuit closed by the carriage, a maintaining-circuit for the restoring-magnet, a short circuit for the same, a circuit for the sounder or other local instrument, and a switch by which the sounder-circuit is made part of the relay-circuit and the signaling-circuit cut out, substantially as described.

9. In an apparatus for controlling one or more local circuits, the combination, with a carriage having two parallel series of pins, points, or detents, part of which are in electrical connection with the carriage, the double series being arranged in accordance with a given succession of electrical impulses of different length, of a contact-pawl vibrating from one series to the other and arresting the movement of the carriage or support, an electro-magnet controlling the vibration of said pawl and lying in the same local circuit with a relay, a restoring-magnet having a circuit which is closed through the contact-pawl and any one of the electrically-connected pins, points, or detents on the carriage, a signaling-circuit closed by the advance of the carriage to its normal limit of movement, a sounder-circuit of which the relay forms part, and a make-and-break interposed in both the signaling-circuit and in the sounder-circuit, by which the former is cut out and the latter cut in, substantially as described.

10. In an apparatus for controlling one or more local circuits, the combination, with a carriage or support having two parallel series of alternating pins, projections, or detents, part of which are in electrical connection with the carriage, and both series arranged in accordance with a predetermined succession of electrical impulses of different length, of means for advancing said carriage, a contact-pawl vibrating from one series to the other and serving as a stop to arrest the movement of the carriage, an electro-magnet energized by impulses transmitted through the back-stop of the relay to control the vibrations of the contact-pawl, and a signaling-circuit closed through the said carriage or support upon reaching its normal limit of movement, substantially as described.

11. In an electrical apparatus for controlling one or more local circuits, the combination, with a mechanically-movable carriage or support having a double and parallel series of alternating pins, projections, or detents, part whereof are electrically connected with and the remainder insulated from said carriage, the whole being arranged in accordance with a definite succession of long and short electrical impulses, of a contact-pawl arranged to stand normally in engagement with the pins or detents of one series and to vibrate therefrom to the pins or detents of the other series to act as a stop for said carriage, an electro-magnet arranged in a circuit of which the back-stop of a relay forms part and attracting a lever actuating said contact-pawl in one direction, a restoring-magnet lying in a circuit established by the engagement of the contact-pawl with one of the electrically-connected pins or detents in either series, a maintaining-circuit for the restoring-magnet, a short circuit therefor, a signaling-circuit, a sounder-circuit connected up with the relay-armature, a make-and-break interposed in each of the signaling and restoring circuits, and a switch by which the sounder-circuit may be included in the main line and the signaling-circuit cut out, substantially as described.

12. In an apparatus for controlling one or more local circuits, a movable carriage or support having mounted therein a double series of projections, points, or detents arranged in harmony with an arbitrary succession of electrical impulses, part of which differ in character from the others, means for advancing such carriage or support, and a vibrating contact which may be brought into mechanical or electric contact alternately and successively with the pins or projections in both series, substantially as described.

13. In an apparatus for controlling one or more electrical circuits, the combination, with a conducting movable carriage or support, of an insulating-shoe, a double parallel series of detents or points set in said shoe, one or more in both series being in electrical contact with the support, means for advancing said support, and a vibrating contact engaging alternately with each series, arresting the advance of the carriage or support, and closing one or more local circuits, substantially as described.

14. In an apparatus for controlling one or more local circuits, the combination, with a movable carriage or support mounted upon a mechanically-controlled base, of a double parallel alternating series of detents or projections mounted on said carriage and arresting the movement of the same, a contact variably engaging one or the other of said series, a magnet in circuit with the back-stop of a relay actuating the support for said contact, a restoring-magnet energized by a local circuit of less resistance than the first magnet and closed through one or more of the detents or stops on the carriage, a maintaining-circuit for the restoring-magnet closed by the action of said magnet, and a short circuit for the latter momentarily closed and then broken by the return of the carriage to place, substantially as described.

In testimony whereof I have affixed my signature in presence of two witnesses.

JAMES L. CUTLER.

Witnesses:
 JAMES L. NORRIS,
 JAMES A. RUTHERFORD.